No. 828,009. PATENTED AUG. 7, 1906.
J. WUNDERLICH.
ELEVATOR.
APPLICATION FILED MAY 4, 1906.
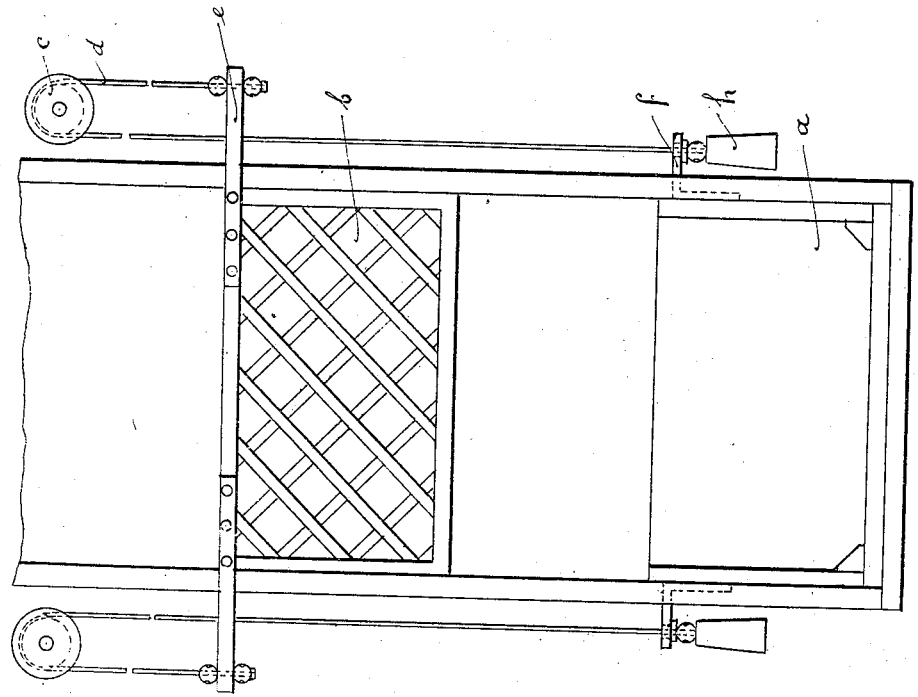
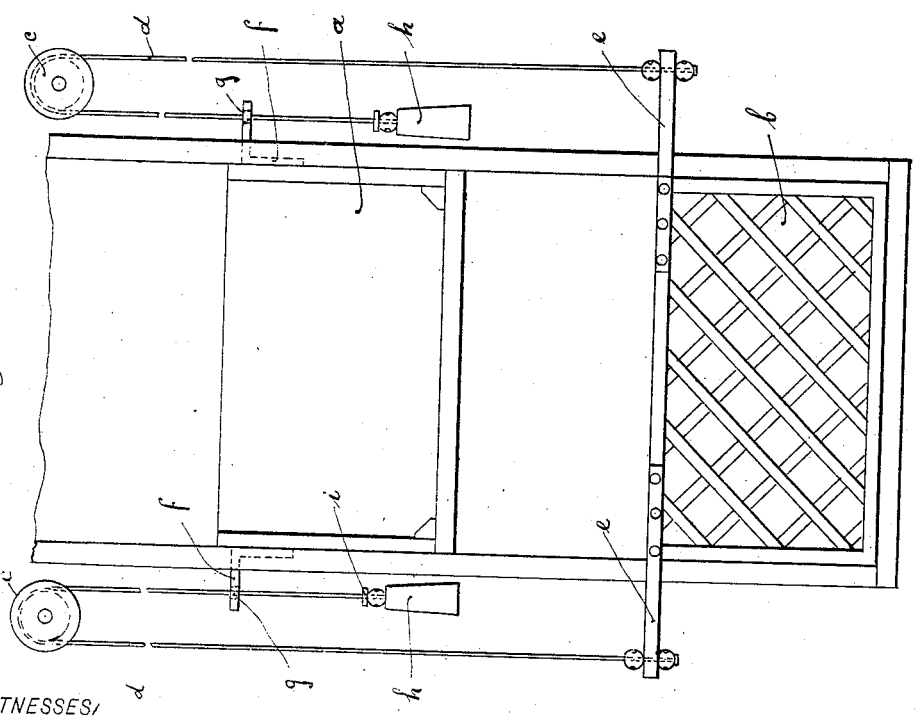
WITNESSES
Harry Hebig
Alexander Ordmann
INVENTOR
John Wunderlich
BY
Max W. Ordmann
ATTORNEY

UNITED STATES PATENT OFFICE.

JOHN WUNDERLICH, OF BROOKLYN, NEW YORK.

ELEVATOR.

No. 828,009.     Specification of Letters Patent.     Patented Aug. 7, 1906.

Application filed May 4, 1906. Serial No. 315,174.

*To all whom it may concern:*

Be it known that I, JOHN WUNDERLICH, a citizen of the United States, and a resident of Brooklyn, in the county of Kings and State of New York, have invented certain new and useful Improvements in Elevators, of which the following is a specification.

The present invention pertains particularly to freight-elevators, and has for its object to provide means whereby the gate will operate by its own weight to close the shaft when the cage is in its upward position and to be raised by the cage so as to open the entrance to the same during the downward movement of the cage.

My invention is illustrated in the accompanying drawings, in which similar reference-letters denote corresponding parts, and in which—

Figure 1 is a front elevation of the cage, showing the elevator in raised position and the gate down; and Fig. 2 is a similar view showing the cage down and the gate in raised position.

With reference to the drawings, $a$ denotes the cage, and $b$ the vertically-movable gate thereof.

$c\ c$ are pulleys suitably fixed at a certain height to the walls of the elevator-shaft.

$d\ d$ are ropes or the like which are guided over said pulleys. The ropes are attached to arms $e\ e$, projecting laterally from the gate.

$f\ f$ are flanges or brackets fixed to the side walls of the cage and provided with apertures $g\ g$, through which the free ends of the ropes are passed.

$h\ h$ are weights carried by the free ends of the ropes, both said weights being together lighter than the gate and serving to stretch the ropes. The length of the ropes is so chosen that when the cage is in its upper position the weights will be suspended at a certain distance below the flanges or brackets $f$ thereof. When the cage will move downward, it will at first not operate the gate at all; but at the moment at which the flanges come in contact with the weights the cage will begin to raise the gate and continue this until it has reached its lowest position.

In order to cushion the noise when the cage strikes the weights, leather washers $i\ i$ are provided on the top of the weights. When the cage rises, the gate, which is heavier than both weights taken together, will sink into its lower position, thereby drawing the weights upward.

What I claim, and desire to secure by Letters Patent, is—

In an elevator, an upwardly-movable gate having arms projecting laterally therefrom, brackets attached to the side walls of the cage, said brackets having apertures, pulleys fixed at each side of the elevator-shaft, ropes guided over said pulleys and attached to the lateral arms of the gate, the free ends of the said ropes being adapted to loosely pass through the apertures of the brackets, weights carried by the said free ends, the said weights being lighter than the gate and adapted to stretch the ropes, substantially as set forth.

Signed at New York, in the county of New York and State of New York, this 3d day of May, A. D. 1906.

JOHN WUNDERLICH.

Witnesses:
   MAX D. ORDMANN,
   ROBERT STRAHL.